US008271623B2

(12) United States Patent
Maguire et al.

(10) Patent No.: US 8,271,623 B2
(45) Date of Patent: Sep. 18, 2012

(54) PERFORMING CONFIGURATION IN A MULTIMACHINE ENVIRONMENT

(75) Inventors: Jill S. Maguire, Redmond, WA (US); Jonathan M. Rowlett, Redmond, WA (US); Yonghua Wei, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 12/353,981

(22) Filed: Jan. 15, 2009

(65) Prior Publication Data

US 2010/0180015 A1 Jul. 15, 2010

(51) Int. Cl.
*G06F 15/177* (2006.01)
(52) U.S. Cl. ............ 709/220; 709/221; 709/222; 713/2; 713/100; 717/106; 717/168
(58) Field of Classification Search ........... 709/220–222
See application file for complete search history.

(56) References Cited

U.S. PATENT DOCUMENTS

| | | | | |
|---|---|---|---|---|
| 5,794,239 A * | 8/1998 | Walster et al. ........................ 1/1 |
| 5,960,404 A * | 9/1999 | Chaar et al. .................. 705/7.26 |
| 5,999,947 A * | 12/1999 | Zollinger et al. ..................... 1/1 |
| 6,098,098 A * | 8/2000 | Sandahl et al. ............... 709/221 |
| 6,304,244 B1 * | 10/2001 | Hawkins et al. .............. 345/502 |
| 6,577,822 B2 * | 6/2003 | Inui et al. ........................ 399/11 |
| 6,725,257 B1 | 4/2004 | Cansler et al. |
| 6,816,964 B1 * | 11/2004 | Suzuki et al. ..................... 713/2 |
| 7,024,471 B2 * | 4/2006 | George et al. ................. 709/222 |
| 7,055,014 B1 | 5/2006 | Pawlowski et al. |
| 7,093,120 B2 | 8/2006 | Keohane et al. |
| 7,103,617 B2 * | 9/2006 | Phatak ................................. 1/1 |
| 7,200,617 B2 * | 4/2007 | Kibuse ................................ 1/1 |
| 7,293,165 B1 * | 11/2007 | Tobias ............................. 713/1 |
| 7,356,679 B1 * | 4/2008 | Le et al. ........................... 713/1 |
| 7,380,243 B2 * | 5/2008 | Sugishita et al. ............. 717/168 |
| 7,533,178 B2 * | 5/2009 | Henniger ...................... 709/227 |
| 7,593,396 B2 * | 9/2009 | Bhandari et al. .............. 370/389 |
| 7,593,947 B2 * | 9/2009 | Nagai et al. ........................... 1/1 |
| 7,636,665 B2 * | 12/2009 | Cooperstone et al. ......... 705/1.1 |
| 7,661,090 B2 * | 2/2010 | Schmidt et al. ............... 717/106 |
| 7,697,419 B1 * | 4/2010 | Donthi ......................... 370/220 |
| 7,730,295 B1 * | 6/2010 | Lee ............................... 713/100 |
| 7,822,963 B2 * | 10/2010 | Willems ........................... 713/2 |
| 8,209,680 B1 * | 6/2012 | Le et al. ........................ 717/174 |
| 2002/0083083 A1 * | 6/2002 | Smith et al. ................... 707/203 |
| 2003/0004875 A1 * | 1/2003 | Kramer et al. .................. 705/40 |
| 2003/0046436 A1 * | 3/2003 | Govindaraj et al. .......... 709/250 |
| 2003/0092386 A1 * | 5/2003 | Miklos et al. ................... 455/41 |

(Continued)

OTHER PUBLICATIONS

Chen, et al., "CoStore: A Storage Cluster Architecture using Network Attached Storage Devices", Retrieved at <<http://ieeexplore.ieee.org/stamp/stamp.jsp?arnumber=1183415&isnumber=26545 >>, Proceedings of the Ninth International Conference on Parallel and Distributed Systems (ICPADS'02), pp. 6.

(Continued)

*Primary Examiner* — Backhean Tiv

(57) ABSTRACT

Aspects of the subject matter described herein relate to performing configuration in a multi-machine environment. In aspects, a client connects with one of a plurality of storage appliances. This storage appliance is sometimes called the coordinator appliance. Any of the storage appliances may act as the coordinator appliance. The coordinator appliance receives configuration data from the client and configures itself and the other storage appliances. During configuration, connectivity between the client and the coordinator appliance and between the coordinator appliance and the other appliances may be lost and re-established.

8 Claims, 6 Drawing Sheets

U.S. PATENT DOCUMENTS

| | | |
|---|---|---|
| 2004/0078542 A1 | 4/2004 | Fuller et al. |
| 2005/0097543 A1* | 5/2005 | Hirayama .................... 717/168 |
| 2005/0246345 A1 | 11/2005 | Lent et al. |
| 2006/0085522 A1 | 4/2006 | Spry |
| 2006/0224723 A1* | 10/2006 | Chen ........................... 709/224 |
| 2007/0073978 A1* | 3/2007 | Lee ............................... 711/141 |
| 2007/0198685 A1* | 8/2007 | Phatak ......................... 709/223 |
| 2008/0244589 A1* | 10/2008 | Darnell et al. ............... 718/102 |
| 2008/0270486 A1* | 10/2008 | Hind et al. ................... 707/201 |
| 2008/0307215 A1* | 12/2008 | Willems ........................... 713/2 |
| 2009/0063766 A1* | 3/2009 | Matsumura et al. ......... 711/113 |
| 2009/0157723 A1* | 6/2009 | De Peuter et al. ........... 707/102 |
| 2009/0187595 A1* | 7/2009 | Akiyama et al. ........... 707/104.1 |
| 2010/0049840 A1* | 2/2010 | Chang .......................... 709/221 |
| 2010/0180015 A1* | 7/2010 | Maguire et al. .............. 709/220 |
| 2011/0173429 A1* | 7/2011 | Hollis ............................... 713/2 |

OTHER PUBLICATIONS

Bruno, et al., "Rolls: Modifying a Standard System Installer to Support User-Customizable Cluster Frontend Appliances", Retrieved at <<http://neesdt3.sdsc.edu/rocks-documentation/4.2.1/papers/cluster2004-roll.pdf>>, Jul. 2, 2004, pp. 10.

* cited by examiner

PERFORMING CONFIGURATION IN A MULTIMACHINE ENVIRONMENT

BACKGROUND

Storage may be provided to a client via one or more appliances attached to a network. For example, a network attached storage (NAS) appliance may be attached to a network to provide storage to one or more clients attached to the network. To provide storage that is highly available, multiple NAS appliances may be configured in a cluster. If one of the NAS appliances fails or becomes unavailable, redundant storage on another NAS appliance may be used.

Configuring storage appliances in a cluster may be confusing, tedious, and time-consuming. For example, a system administrator or the like may need to serially connect to each of the storage appliances via a Web interface and configure the storage appliances. Configuring each storage appliance may involve rebooting the storage appliance one or more times.

Alternatively, in some systems, a system administrator may be able to connect to a node that manages the storage appliances. The system administrator may supply parameters to the node which may then configure the storage appliances as appropriate. Unfortunately, having another node to manage the storage appliances adds to costs associated with the cluster.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to performing configuration in a multi-machine environment. In aspects, a client connects with one of a plurality of storage appliances. This storage appliance is sometimes called the coordinator appliance. Any of the storage appliances may act as the coordinator appliance. The coordinator appliance receives configuration data from the client and configures itself and the other storage appliances. During configuration, connectivity between the client and the coordinator appliance and between the coordinator appliance and the other appliances may be lost and re-established.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. Other definitions, explicit and implicit, may be included below.

Exemplary Operating Environment

Figure 1:
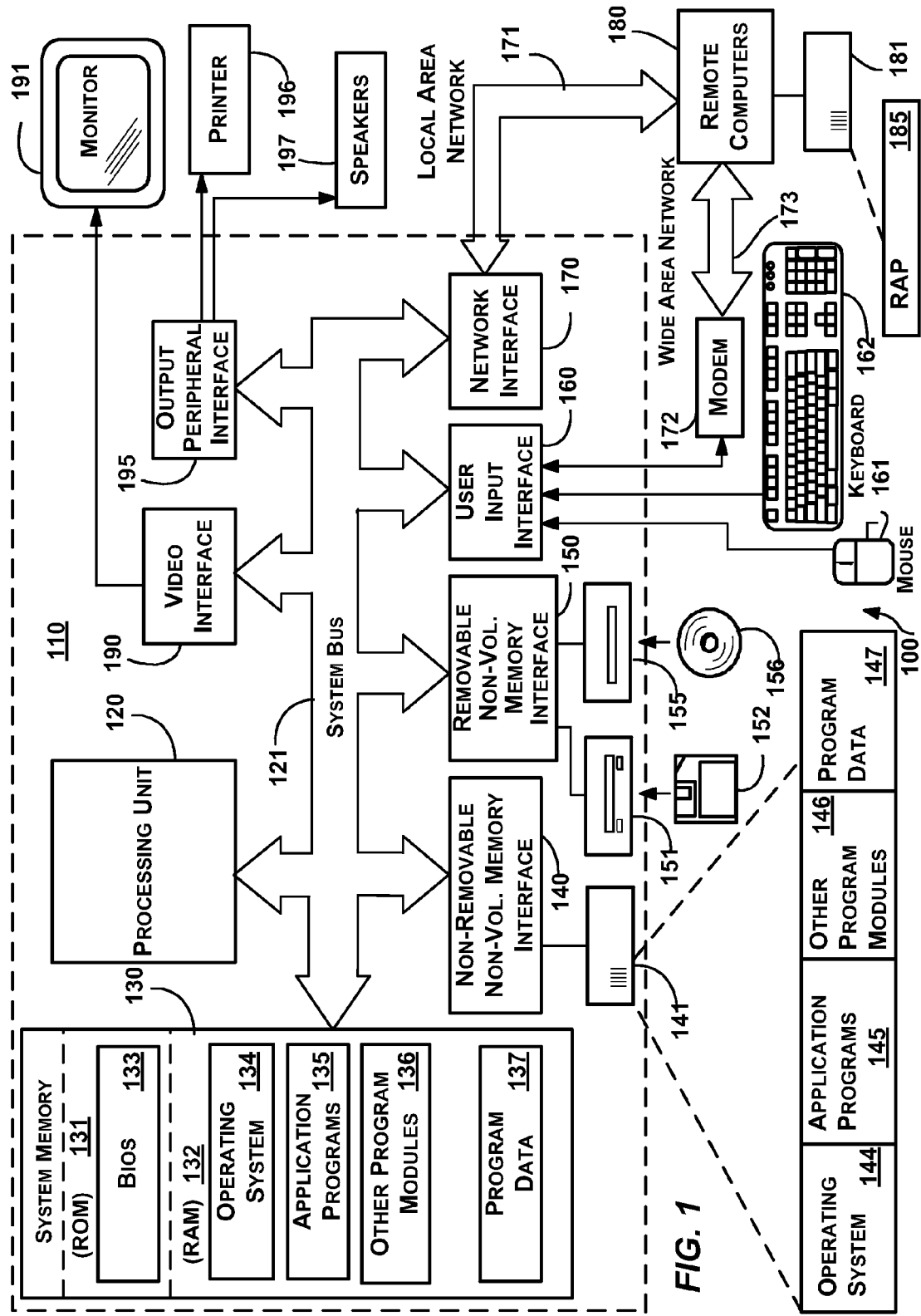
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data are given different numbers herein to illustrate that, at a minimum, they are different copies.

A user may enter commands and information into the computer 20 through input devices such as a keyboard and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

Performing Configuration

Figure 2:
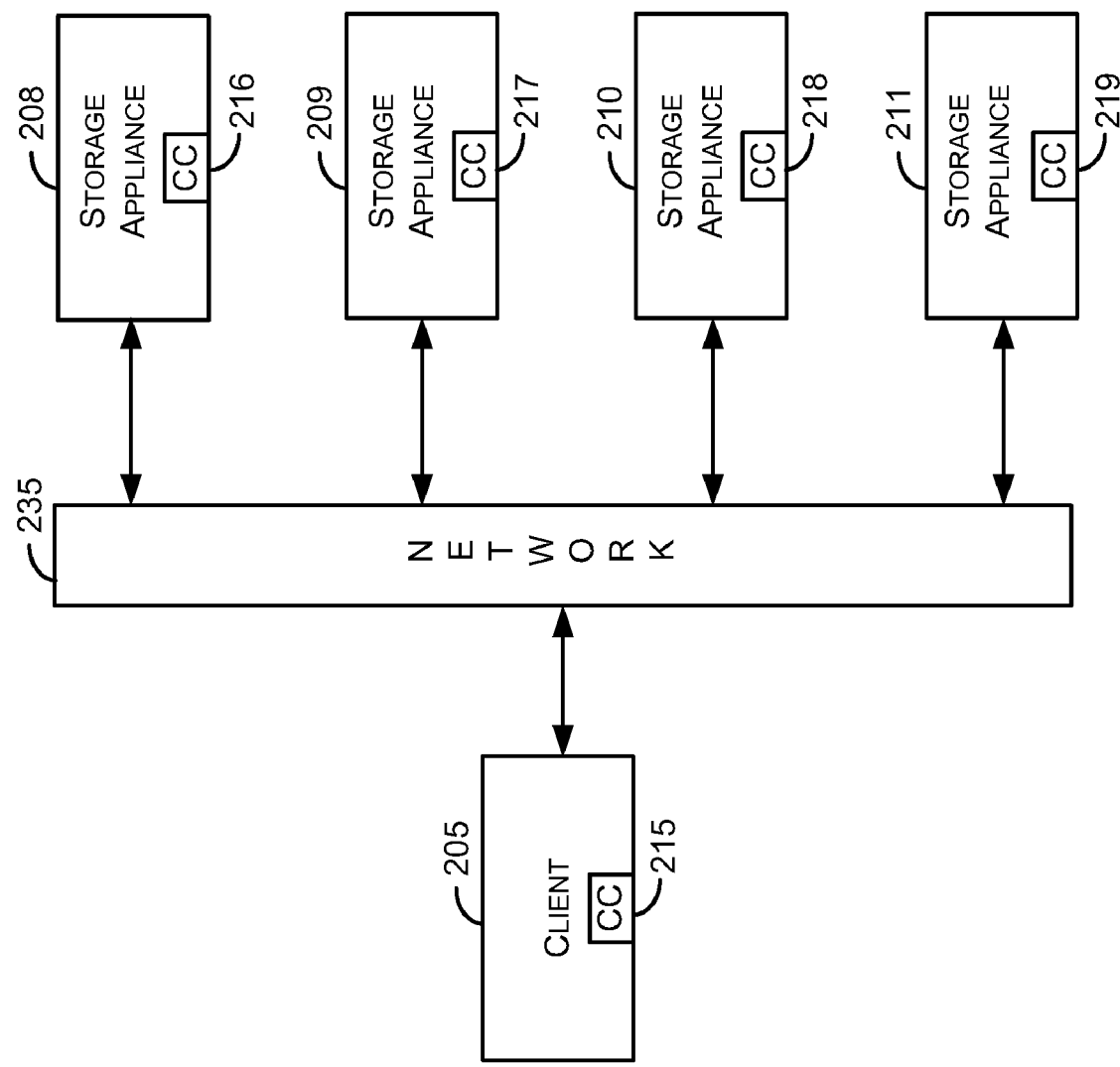
FIG. 2 is a block diagram representing an exemplary environment in which aspects of the subject matter described herein may be implemented.

As mentioned previously, configuring storage appliances in a cluster may be confusing, tedious, and time-consuming. FIG. 2 is a block diagram representing an exemplary environment in which aspects of the subject matter described herein may be implemented. The environment may include a client 205, storage appliances 208-211, a network 235, and may include other entities (not shown). The client 205 may include configuration components 215 while the storage appliances 208-211 may include configuration components 216-219. The various entities depicted in FIG. 2 may be located relatively close to each other or may be distributed across the world. The various entities may communicate with each other via various networks including intra- and inter-office networks and the network 235.

In an embodiment, the network 235 may comprise the Internet. In an embodiment, the network 235 may comprise one or more local area networks, wide area networks, direct connections, virtual connections, private networks, virtual private networks, some combination of the above, and the like.

The client 205 may comprise or reside on one or more general or special purpose computing devices. Such devices may include, for example, personal computers, server computers, hand-held or laptop devices, multiprocessor systems, microcontroller-based systems, set top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the client 205 indicated in FIG. 2 comprises the computer 110 of FIG. 1.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. In an embodiment, a client and a server may both be peers, servers, or clients. In one embodiment, a client and a server may be implemented on the same physical machine.

As used herein, each of the terms "server" and "client" may refer to one or more physical entities, one or more processes executing on one or more physical entities, and the like. Thus, a server may include an actual physical node upon which one or more processes execute, a service executing on one or more physical nodes, or a group of nodes that together provide a service. A service may include one or more processes executing on one or more physical entities.

Aspects of the subject matter described herein are independent of and may be practiced inside or outside a virtual hosting environment. In addition, aspects of the subject matter described herein are independent of and may be practiced with or without specialized hardware-based methods (e.g., specialized management ports) used to communicated with remote machines.

In one embodiment, the storage appliances 208-211 may comprise special purpose computing devices that are designed to provide storage to entities on the network 235. In one embodiment, such special purpose computing devices may be suited specifically for providing storage and may not have other unrelated purposes (e.g., firewall, security, Web services, print services, and so forth). In this capacity, a storage appliance may have facilities related to accessing the storage such as limiting access to the storage to authorized users, encrypting data stored on the storage, backing up, mirroring, copying data stored on the storage, and the like. In other embodiments, a storage appliance may have some other unrelated purposes (e.g., print services, a network device, and so forth).

In another embodiment, the storage appliances 208-211 may comprise or reside on one or more general or special purpose computing devices. Such devices may include, for example, the devices indicated in conjunction with the client 205. In this embodiment, an exemplary device that may be configured to act as a storage appliance comprises the computer 110 of FIG. 1.

The configuration components 216-220 allow configuration of the storage appliances 208-211. In particular, the client 205 may select one (e.g., any) of the storage appliances with which to communicate. This storage appliance is sometimes referred to as the coordinator appliance. The coordinator appliance may receive configuration data from the client 205 and may then communicate with the other storage appliances to configure them in accordance with the configuration data received from the client 205. If the coordinator appliance fails or become inoperable, the coordinator role can be resumed by any of the remaining machines in the group. This is achieved, in part, by having the client connect to any of the remaining appliances.

Configuration tasks include, for example, changing appliance names, changing credentials (e.g., username and password) of an appliance, changing the domain to which an appliance is joined, changing an IP address of an appliance, changing the time or time zone of an appliance, changing storage parameters of an appliance, and so forth.

Figure 3:
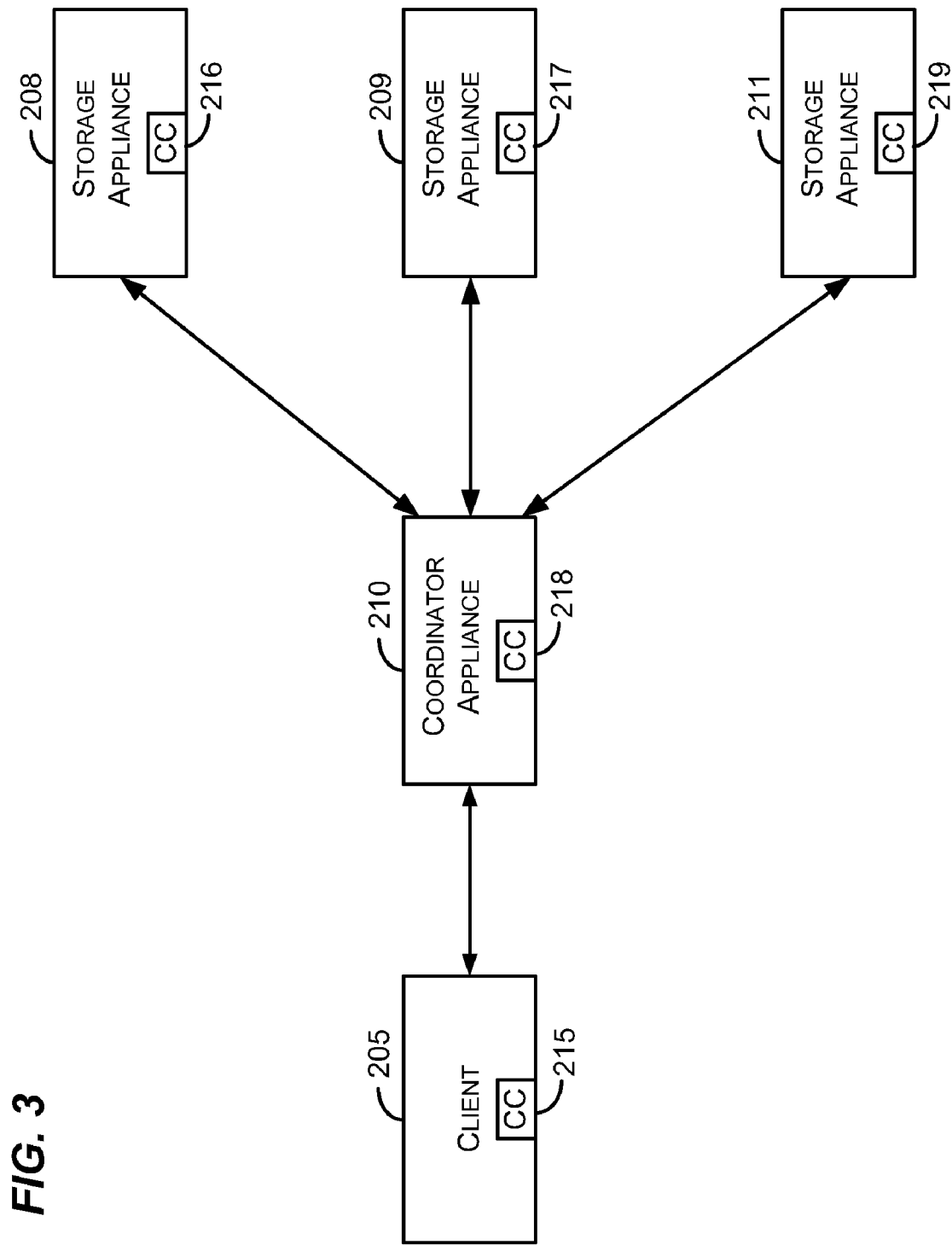
FIG. 3 illustrates an exemplary environment in which a coordinator application has been selected in accordance with aspects of the subject matter described herein.

FIG. 3 illustrates an exemplary environment in which a coordinator application has been selected in accordance with aspects of the subject matter described herein. As illustrated in FIG. 3, the client 205 has selected the storage appliance 210 as the coordinator appliance and communicates with the coordinator appliance 210 with respect to configuration changes for the appliances 208-211.

Configuring a storage appliance may involve configuration changes that can be made before losing connectivity with the storage appliance, configuration changes that can be made during loss of connectivity with the storage appliance, and configuration changes that can be made after regaining connectivity with the storage appliance. For example, changing an Internet Protocol (IP) address, changing a domain to which the storage appliance is joined, changing a network name, and other changes made to a storage appliance may cause the storage appliance to lose connectivity. Other settings on a storage appliance, such as changing the time, time zone, or other settings, may be changed without losing connectivity.

The exemplary configuration changes indicated above are not intended to be all-inclusive or exhaustive. Indeed, based on the teachings herein, those skilled in the art may recognize many other configuration changes that can be made at various stages without departing from the spirit or scope of aspects of the subject matter described herein.

In conjunction with receiving configuration data from the client, the coordinator appliance may order configuration tasks based on tasks that may be performed before losing connectivity with a storage appliance, tasks that may be performed during loss of connectivity, and tasks that may be performed after regaining connectivity with the storage appliance.

In conjunction with generating a task list, the coordinator appliance may send tasks to the other appliances for the other appliances to perform. In conjunction with sending the tasks, the coordinator appliance may specify synchronization points. In this context, a synchronization point relates to a point at which an appliance is to wait for a communication from the coordinator appliance before performing additional configuration tasks.

For example, if there are ten tasks, six of which are to be performed before rebooting an appliance, one to be performed during reboot, and three to be performed after reboot, the coordinator appliance may specify synchronization points after the sixth and seventh tasks. After an appliance has completed the sixth task it may inform the coordinator appliance that is has completed the task and may wait for a message from the coordinator appliance before proceeding with the seventh task. This may also occur after the appliance has completed the seventh task. In some embodiments, synchronization points may occur after each task is completed.

Synchronization points may be set for a variety of reasons including, for example, ensuring that connectivity exists or is restored after an action is taken.

Prior to engaging in a reboot action, the coordinator appliance stores credentials of the other appliances in a secure store (e.g., a credentials store) and may serialize (e.g., write) tasks and associated state (e.g., return codes from other appliances) to non-volatile storage (e.g., a hard disk). Before initiating a reboot, the coordinator appliance may also schedule a process to execute after the coordinator appliance reboots. After the coordinator appliance reboots, this process may obtain the credentials from the credentials store and de-serialize (e.g., read) the tasks and associated state from the non-volatile storage and place them in volatile memory (e.g., RAM). The coordinator appliance may then attempt to re-establish connectivity with the other appliances.

In re-establishing connectivity with the other appliances, the coordinator appliance may perform one or more actions. Some exemplary actions include attempting to connect using a new machine name of the appliance, attempting to connect using an old machine name of the appliance, attempting to connect using a new network address of the appliance, attempting to connect using an old network address of the appliance, attempting to connect using new credentials of the appliance, attempting to connect using old credentials of the appliance, a combination of the above, and the like. The coordinator appliance may poll the other appliances for a period of time (e.g., a timeout) when attempting to re-establish connectivity.

Similarly, after losing connectivity with the coordinator appliance 210, periodically, the configuration components 215 of the client 205 may also attempt to re-establish connectivity with a coordinator appliance. The client 205 may attempt to re-establish connectivity with a coordinator appliance by one or more actions including attempting to connect to the coordinator appliance using a new machine name of the coordinator appliance, attempting to connect to the coordinator appliance using an old machine name of the coordinator, attempting to connect to the coordinator appliance using a new network address of the coordinator appliance, attempting to connect to the coordinator appliance using an old network address of the coordinator appliance, attempting to connect to the coordinator appliance using new credentials of the coordinator appliance, attempting to connect to the coordinator appliance using old credentials of the coordinator appliance, a combination of the above, and the like.

If the client is unable to re-establish connectivity with the coordinator appliance, the client may attempt to establish connectivity with one of the other appliances. For example, when the client 205 connects with the coordinator appliance 210, the client 205 may receive a list of the other appliances that are in the group (e.g., the storage appliances 208, 209, and 211). After losing connectivity with the coordinator appliance 210, the client 205 attempts to regain connectivity with the coordinator appliance 210 using the mechanisms described above.

If the client 205 is unable to regain connectivity with the coordinator appliance 210, the client 205 may attempt to connect to each of the other appliances in the group until a connection is established with one of the appliances or until a timeout period expires. In attempting to establish connectivity with another appliance, the client 205 may use the connection mechanisms (e.g., new name, old name, etc.) described above with respect to the coordinator appliance. After establishing connectivity with another storage appliance, the client 205 may resume configuring the storage appliances using the other storage appliance as the new coordinator appliance.

In one embodiment, the configuration components 215 of the client 205 may be configured in an asynchronous JavaScript and XML (AJAX) configuration. In the AJAX configuration, after losing connectivity with a coordinator appliance, the client may periodically attempt to re-establish connectivity with the coordinator appliance (e.g., using the actions above) via code in a browser on the client. Because the coordinator appliance may change IP addresses, names, domains, and so forth, security mechanisms within AJAX may prohibit re-establishing connectivity with what appears to be a different node.

To overcome this, in one embodiment, a browser on the client 205 may use code in an IFrame to attempt to re-establish connectivity with the coordinator appliance. When the code within the IFrame re-establishes connectivity with the coordinator appliance, code in a browser object that is a parent of the IFrame may connect to the coordinator appliance and obtain status information therefrom. To determine whether the code within the IFrame has re-established connectivity, the parent code may monitor messages sent by the IFrame code to see if a connection with the coordinator node has been established.

The examples given above of different actions that may be undertaken to re-establish connectivity with an appliance are not intended to be all-inclusive or exhaustive. Based on the teachings herein, those skilled in the art may recognize other actions that may be undertaken to attempt to re-establish connectivity with an appliance without departing from the spirit or scope of aspects of the subject matter described herein.

In one embodiment, the configuration components 215 of the client 205 may comprise a Web browser. The configuration components 216-219 of the storage appliances 208-211 may comprise Web servers that are capable of responding to requests from the Web browser of the client 205. The coordinator appliance may communicate with the other storage appliances via their Web servers.

In another embodiment, the configuration components of the client 205 and/or the storage appliances 208-211 may comprise one or more processes that are designed to communicate with each other without using a Web server. For example, the configuration components may communicate with each other directly.

Although the environments described above includes a client and four storage appliances, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 4:
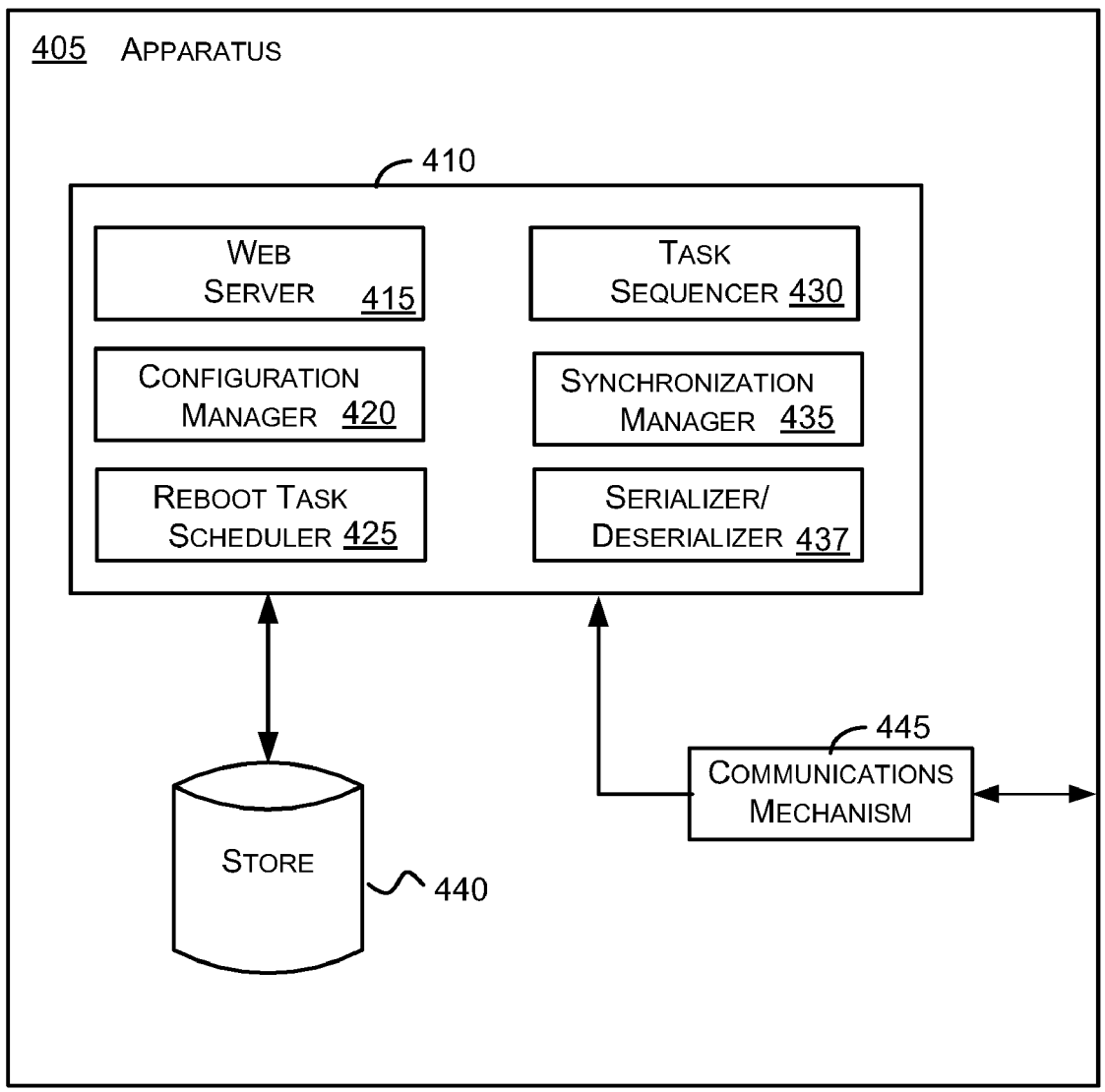
FIG. 4 is a block diagram that represents an apparatus configured as a storage appliance in accordance with aspects of the subject matter described herein.

FIG. 4 is a block diagram that represents an apparatus configured as a storage appliance in accordance with aspects of the subject matter described herein. The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices.

Turning to FIG. 4, the apparatus 405 may include configuration components 410, a store 440, and a communications mechanism 445. The configuration components 410 may include a Web server 415, a configuration manager 420, a reboot task scheduler 425, a task sequencer 430, a synchronization manager 435, and a serializer/deserializer 437.

The communications mechanism 445 allows the apparatus 405 to communicate with other entities shown in FIG. 2. The communications mechanism 445 may be a network interface or adapter 170, modem 172, or any other mechanism for establishing communications as described in conjunction with FIG. 1.

The store 440 is any storage media capable of storing data. The term data is to be read broadly to include anything that may be stored on a computer storage medium. Some examples of data include information, program code, program state, program data, other data, and the like. The store 440 may comprise a file system, database, volatile memory such as RAM, other storage, some combination of the above, and the like and may be distributed across multiple devices. The store 440 may be external, internal, or include components that are both internal and external to the apparatus 405.

The Web server 415 comprises a process that receives Web request (e.g., via HTTP or otherwise) and responds to such requests. The Web server 415 may act as a conduit through which one or more of the other configuration components may communicate with entities outside of the apparatus 405. For example, the Web server 415 may provide Web pages that allow a client to communicate with a coordinator appliance. As another example, when located on a non-coordinator appliance, the Web server 415 may provide one communication path whereby a coordinator appliance may communicate with the non-coordinator appliance.

The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device.

The configuration manager 420 is operable to receive configuration data for one or more appliances. For example, when the apparatus 405 is acting as a coordinator appliance (such as the coordinator appliance 210 of FIG. 3), the configuration manager 420 may receive configuration data for itself and other storage appliances in a cluster (e.g., the storage appliances 208-211). When the apparatus 405 is acting as a coordinator appliance, the configuration manager 420 is further operable to configure itself and the other appliances based on the received configuration data.

The reboot task scheduler 425 is operable to indicate a program to execute upon reboot. Many operating systems are able to execute one or more processes upon reboot. The reboot task scheduler 425 indicates what programs to execute to restart the configuration components 410 of the apparatus 405 after a reboot has occurred. One thing that the configuration components 410 may do upon reboot is read the tasks and associated state from the store 440.

The task sequencer 430 is operable to order tasks to configure to configure the one or more appliances based on the configuration data. The task sequencer may order the tasks according to pre-loss of connectivity actions, during loss of connectivity actions, and after regaining connectivity actions.

The synchronization manager 435 is operable to ensure that tasks are synchronized across storage appliances. In particular, when a storage appliance is a non-coordinator appliance, the synchronization manager 435 may wait after it reaches a synchronization point until the non-coordinator appliance receives a message to proceed from the coordinator appliance. On the coordinator appliance, the synchronization manager 435 may inform the other appliances of synchronization points and may send messages to the other appliances to inform the other appliances when they may proceed past a synchronization point.

The serializer/deserializer 437 is operable to write/read tasks and associated state to/from the store 440. Writing tasks and associated state to the store 440 may occur before initiating a reboot of a coordinator appliance while reading the tasks and state may occur after the reboot.

Figure 5:
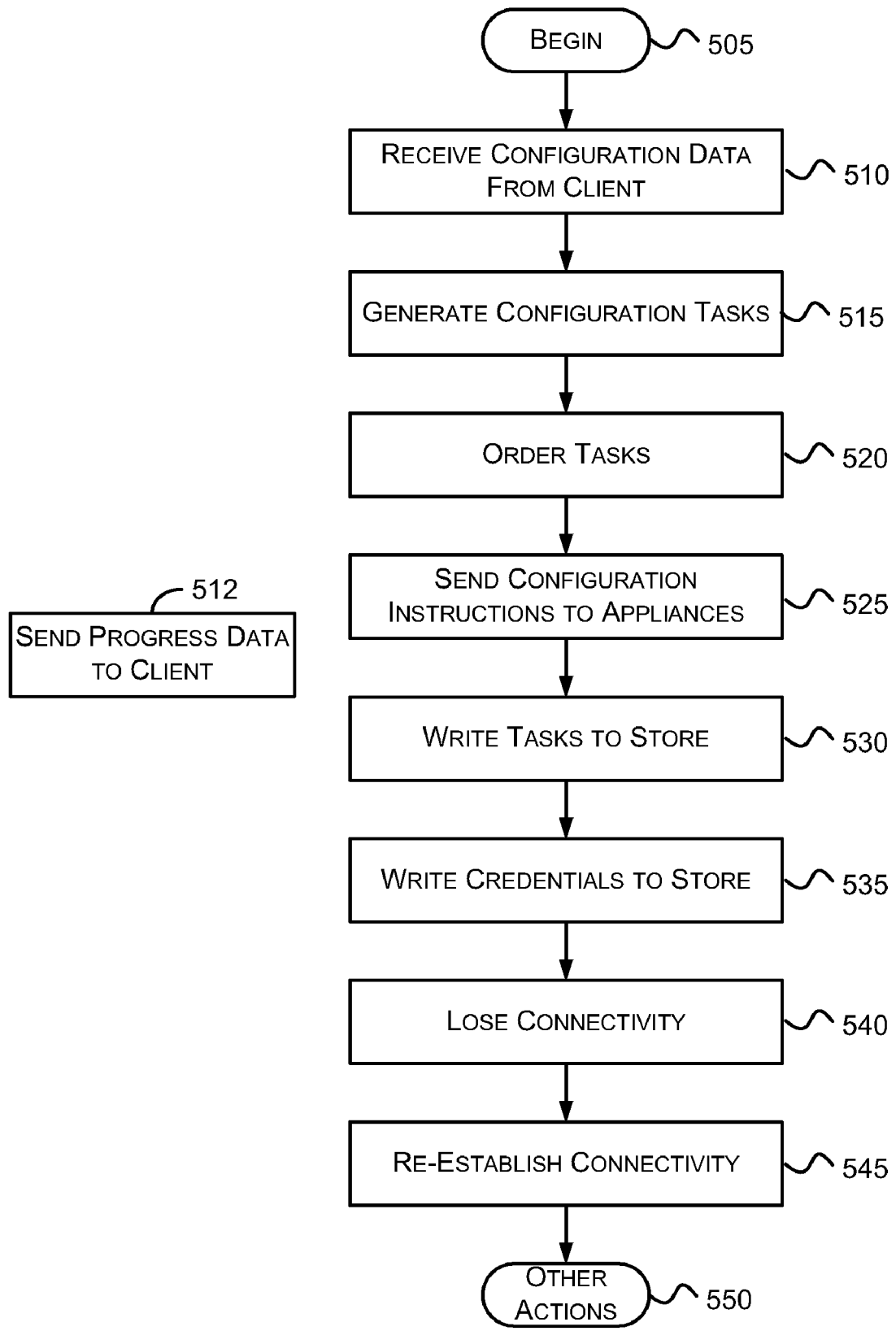
FIG. 5 is a flow diagram that generally represents actions that may occur on a coordinator appliance in accordance with aspects of the subject matter described herein.
Figure 6:
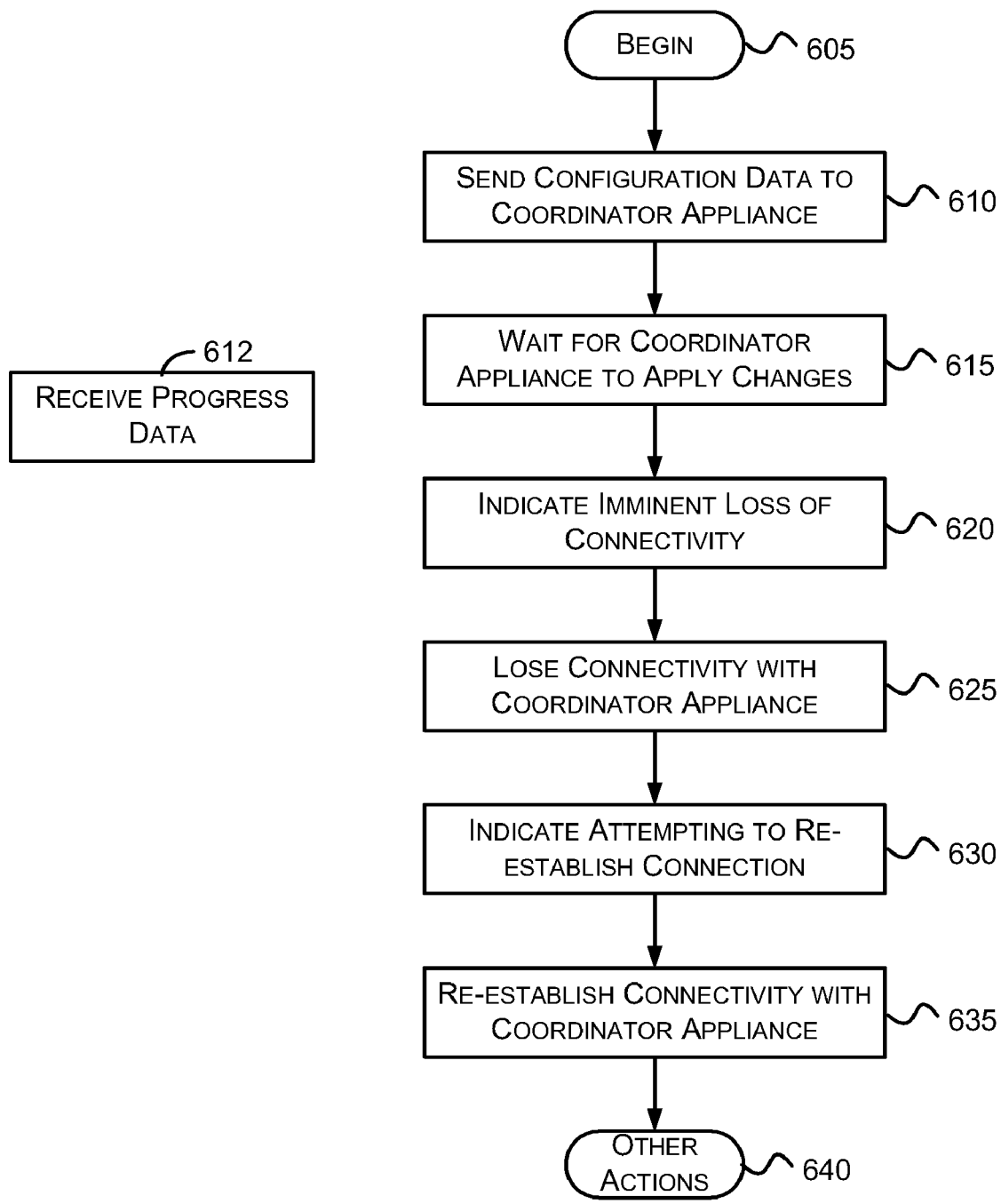
FIG. 6 is a flow diagram that generally represents actions that may occur on a client in accordance with aspects of the subject matter described herein.

FIGS. 5-6 are flow diagrams that generally represent actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents actions that may occur on a coordinator appliance in accordance with aspects of the subject matter described herein. At block 505, the actions begin.

At block 510, configuration data is received from a client. The configuration data is received at one of the storage appliances. The configuration data relates to configuration settings associated with the storage appliances. For example, referring to FIG. 3, the coordinator appliance 210 may receive configuration data from the client 205 for the appliances 208-211.

At block 515, configuration tasks are generated to configure the appliances in accordance with the configuration data. For example, referring to FIG. 4, the configuration manager 420 may generate tasks to be performed to configure the appliances in accordance with the configuration data.

At block 520, the tasks are ordered according to pre-loss of connectivity tasks, during loss of connectivity tasks, and after regaining connectivity tasks. For example, referring to FIG. 4, the task sequencer 430 orders the tasks.

At block 525, instructions corresponding to the tasks are sent from the coordinator appliance to the other appliances to configure the other appliances. For example, referring to FIG. 3, the coordinator appliance 210 sends the instructions to the storage appliances 208, 209, and 211.

At block 530, the tasks and associated data are written to a store. For example, referring to FIG. 4, the serializer 437 writes the tasks and associated data to the store 440.

At block 535, credentials are written to a store. For example, referring to FIG. 437, the configuration manager 420 securely writes credentials of the other storage appliances to the store 440.

At block 540, connectivity may be lost. For example, referring to FIG. 3, the coordinator appliance may lose connectivity with the storage appliances 208, 209, and 211 and may also lose connectivity with the client 205.

At block 545, connectivity may be re-established. For example, the coordinator appliance 210 re-establishes connectivity with the storage appliances 208, 209, and 211 and may also restore connectivity with the client 205. Connectivity may be restored, for example, using one or more of the techniques previously described.

At block 512, progress data (e.g., via a message) is sent to the client that informs the client as to progress in configuring the plurality of appliances. This progress data may, for example, be sent periodically any time the coordinator appliance is connected to the client.

At block 550, other actions, if any, are performed.

FIG. 6 is a flow diagram that generally represents actions that may occur on a client in accordance with aspects of the subject matter described herein. At block 605, the actions begin.

At block 610, configuration data is sent to the coordinator appliance. For example, referring to FIG. 3, the client 205 sends configuration data (e.g., via a Web page) to the coordinator appliance 210.

At block 615, the client waits for the coordinator appliance to apply changes corresponding to the configuration data to the storage appliances. For example, referring to FIG. 3, the client 205 waits for the coordinator appliance 210 to apply the changes to the appliances 208-211

While waiting for the coordinator appliance to appliances, at block 612, the client may periodically receive progress data that indicates progress in configuring the appliances in accordance with the configuration data. For example, referring to FIG. 3, the client 205 may receive progress data from the coordinator appliance 210. This progress data may be received at any time the client is connected to the coordinator appliance 210.

At block 620, the client indicates an imminent loss of connectivity with the coordinator appliance. For example, referring to FIG. 3, the client 205 may display an indicator (e.g., text, graphics, or otherwise) that indicates that the client 205 is about to lose connectivity with the coordinator appliance. This may be done, for example, so that a user does not close the browser on the client 205.

At block 625, the client loses connectivity with the coordinator appliance during at least one point while the coordinator appliance applies the changes. For example, referring to FIG. 3, the client 205 loses connectivity to the coordinator appliance 210 while the coordinator appliance 210 is rebooting.

At block 630, the client indicates that the client is attempting to re-establish a connection with the coordinator appliance. For example, referring to FIG. 3, the client may display an indicator (e.g., a spinning graphics, text, or the like) that indicates that configuring is occurring and that the client is attempting to re-establish connectivity to the coordinator appliance 210.

At block 635, the client re-establishes connectivity with the coordinator appliance. For example, referring to FIG. 3, the client re-establishes connectivity with the coordinator appliance 210.

At block 640, other actions, if any, may be performed.

As can be seen from the foregoing detailed description, aspects have been described related to performing configuration in a multi-machine environment. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

receiving, from a client, configuration data for a plurality of appliances, the configuration data being received at a coordinator appliance that is one of the plurality of appliances, each of the plurality of appliances being able to act as the coordinator appliance, the plurality of appliances adapted to provided storage accessible via a network;

generating a plurality of tasks to perform to configure the plurality of appliances in accordance with the configuration data;

ordering the tasks according to pre-loss of connectivity tasks, during loss of connectivity tasks, and after regaining connectivity tasks, wherein at least one of the pre-loss of connectivity tasks causes a loss of connectivity, wherein the at least one of the pre-loss of connectivity tasks which causes the loss of connectivity comprises at least one of changing an Internet Protocol address of a particular appliance or changing a domain to which the particular appliance is joined;

prior to losing connectivity, sending instructions corresponding to the tasks, including the pre-loss of connectivity tasks, the during loss of connectivity tasks, and the after regaining connectivity tasks, from the coordinator appliance to other appliances of the plurality of appliances to configure the other appliances, wherein sending instructions from the coordinator appliance to other appliances of the plurality of appliances comprises sending an indication of a synchronization point at which the other appliances of the plurality of appliances are to wait to perform additional configuration tasks until receiving a message from the coordinator appliance, wherein the synchronization point is immediately prior to a reboot instruction, the reboot instruction having been previously sent by the coordinator appliance; and sending a message to the client that informs the client as to progress in configuring the plurality of appliances.

2. The method of claim 1, further comprising attempting to re-establish connectivity with an appliance of the plurality of appliances after the appliance has rebooted.

3. The method of claim 2, wherein attempting to re-establish connectivity with an appliance of the plurality of appliances after the appliance has rebooted comprises one or more of attempting to connect using a new machine name of the appliance, attempting to connect using an old machine name of the appliance, attempting to connect to the appliance using a new network address of the appliance, attempting to connect to the appliance using an old network address of the appliance, attempting to connect to the appliance using new credentials of the appliance, and attempting to connect to the appliance using old credentials of the appliance.

4. The method of claim 1, wherein, from a client, receiving configuration data for a plurality of appliances comprises receiving the configuration data via a Web server of the coordinator appliance.

5. The method of claim 1, wherein sending instructions from the coordinator appliance to the other appliances of the plurality of appliances comprises sending the instructions via Web servers of the other appliances of the plurality of appliances.

6. The method of claim 1, further comprising writing the tasks and return codes from the other appliances of the plurality of appliances to non-volatile storage prior to rebooting the coordinator appliance.

7. The method of claim 1, further comprising storing credentials of the other appliances of the plurality of appliances in a secure, persistent store of the coordinator appliance.

8. In a computing environment, an apparatus comprising a processing unit coupled to a memory, the apparatus further comprising:
- a configuration manager operable to receive configuration data for one or more appliances, the appliances adapted to provide storage accessible via a network, each of the appliances including an instance of the configuration manager, the configuration manager being operable to configure the one or more appliances based on the configuration data;
- a task sequencer operable to order tasks to configure the one or more appliances based on the configuration data, the task sequencer operable to order the tasks according to pre-loss of connectivity actions, during loss of connectivity actions, and after regaining connectivity actions, wherein at least one of the pre-loss of connectivity tasks causes a loss of connectivity, wherein the at least one of the pre-loss of connectivity tasks which causes the loss of connectivity comprises at least one of changing an Internet Protocol address of a particular appliance or changing a domain to which the particular appliance is joined;
- a serializer operable to write the tasks and associated state to a store;
- a synchronization manager operable to indicate to wait at a synchronization point until instructed to proceed; and
- a reboot task scheduler operable to indicate a program to execute upon reboot, the program operable at least to re-start the configuration manager upon reboot and to read the tasks and associated state from the store.

* * * * *